US006418901B2

(12) United States Patent
Haberl et al.

(10) Patent No.: US 6,418,901 B2
(45) Date of Patent: Jul. 16, 2002

(54) METHOD OF PRODUCING A METAL COMPONENT INTERACTING BY WAY OF A SLIDING SURFACE WITH A FRICTION PARTNER FOR A DRIVE ASSEMBLY

(75) Inventors: Alois Haberl, Jesenwang; Rudolf Flierl, Munich, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/756,859

(22) Filed: Jan. 10, 2001

(30) Foreign Application Priority Data

Feb. 12, 2000 (DE) ........................................ 100 06 269

(51) Int. Cl.[7] ................................................ B23P 15/14
(52) U.S. Cl. .................................................... 123/188.9
(58) Field of Search ........................... 123/188.9, 188.6, 123/190.17; 29/893

(56) References Cited

U.S. PATENT DOCUMENTS

| | | | | | |
|---|---|---|---|---|---|
| 4,077,810 | A | | 3/1978 | Ohuchi | |
| 4,786,340 | A | * | 11/1988 | Ogawa et al. | 148/439 |
| 4,934,442 | A | | 6/1990 | Futamura | |
| 5,019,178 | A | * | 5/1991 | Barlow et al. | 420/534 |
| 5,055,016 | A | | 10/1991 | Kawade | 418/179 |
| 5,057,274 | A | * | 10/1991 | Futamura et al. | 420/534 |
| 5,355,930 | A | | 10/1994 | Donahue | |
| 5,494,540 | A | * | 2/1996 | Ochi et al. | 148/552 |
| 6,289,785 | B1 | * | 9/2001 | Ikeda et al. | 92/71 |

FOREIGN PATENT DOCUMENTS

| | | |
|---|---|---|
| CH | 665 223 | 2/1985 |
| CH | 665223 | 4/1988 |
| DE | 2 201 534 | 1/1972 |
| DE | 2201534 | 7/1973 |
| DE | 19523484 | 1/1997 |
| DE | 10006269 | 8/2001 |
| EP | 0 341 714 | 5/1989 |
| EP | 0341714 | 11/1989 |
| EP | 0 466 120 | 7/1991 |
| EP | 0466120 | 1/1992 |
| EP | 0 508 426 | 4/1992 |
| EP | 0672760 | 6/1995 |
| EP | 0669404 | 8/1995 |
| EP | 0508426 | 9/1998 |
| GB | 1109084 | 4/1968 |
| JP | 62238347 | 10/1987 |
| JP | 01298131 | 12/1989 |
| JP | 4-325 648 | 11/1992 |
| JP | 4325648 | 11/1992 |
| JP | 62-238 347 | 4/1996 |
| JP | 11226723 | 8/1999 |

OTHER PUBLICATIONS

Z. Ishijima, et al. "Development of P/M forged Al–Si alloy for connecting rod" Chemical Abstracts, Jun. 1999.
Copy of Search Report.
Kamer, et al. "Aluminium–Taschenbuch" Aluminium–Verlag, 1995.
*Aluminium–Taschenbuch*, (1995) Dr. Catrin Kammer, pp. 596–599.

* cited by examiner

*Primary Examiner*—Marguerite McMahon
*Assistant Examiner*—Hyder Ali
(74) *Attorney, Agent, or Firm*—Crowell & Moring LLP

(57) ABSTRACT

A method of producing a metal component interacting by way of a sliding surface with a friction partner, for a drive assembly, includes forming the component from an aluminum-silicon-copper-magnesium alloy. The alloy has 12–15 wt. % silicon, 2.5–3.5 wt. % copper, and 0.4–0.8 wt. % magnesium. The particle size for the silicon is between 4 $\mu$m and 30 $\mu$m. The sliding surface of the component in the firm condition is compressed by calibrating.

12 Claims, No Drawings

METHOD OF PRODUCING A METAL COMPONENT INTERACTING BY WAY OF A SLIDING SURFACE WITH A FRICTION PARTNER FOR A DRIVE ASSEMBLY

This application claims the priority of German patent document 100 06 269.5, filed Feb. 12, 2000, the disclosure of which is expressly incorporated by reference herein.

BACKGROUND AND SUMMARY OF INVENTION

The present invention relates to a method of producing a metal component interacting by way of a sliding surface with a friction partner for a drive assembly, particularly an internal-combustion engine. The component is formed of an at least eutectic aluminum silicon alloy for achieving a wear-resistant sliding surface.

From U.S. Pat. No. 5,055,016, for example, a vane cell compressor is known, in which components having sliding surfaces acted upon by friction are formed of an aluminum silicon alloy. The silicon content is selected in percentages by weight between 12–20% as a function of the respective friction partner.

Further, a compressor is known from European Patent Document EP 0 508 426 B1 which has a stationary worm and a rotating worm. One of the worms is formed from a hypereutectic aluminum silicon alloy which, in addition to copper and magnesium alloy fractions, comprises additional alloy elements from Group IIIa, Group IVa, as well as Group Va, in order to achieve, in addition to a high resistance to wear, also a high stability of the component.

It is an object of the present invention to provide an Al-Si alloy which is reasonable in cost with respect to stability and high resistance to wear and which also makes it possible to increase the stability and resistance to wear of the sliding surface qualitatively by means of a mechanical aftertreatment.

For achieving this object, an aluminum-silicon-copper-magnesium alloy is used with, in each case, a weight-related alloy fraction of 12–15% Si, 2.5–3.5% Cu and 0.4–0.8% Mg. The particle size for the silicon is between 4 μm and 30 μm. The sliding surface of the component in the firm condition is compressed by calibrating.

The alloy according to the present invention represents a selection of a material of the desired stability and of a relatively high resistance to wear. The resistance to wear is increased by the subsequent calibrating of the respective sliding surface of the component by a compacted embedding of the silicon particles. As a further development of the present invention, an AlSiCuMg alloy with Si=14%, Cu=3% and Mg=0.6% is preferred as a sintered material for constructing the component. The particle size of silicon in the sliding surface amounts to approximately 8 to 20 μm.

According to another manufacturing method, the component may be produced from an Al-Si alloy according to the present invention by cutting.

DETAILED DESCRIPTION OF INVENTION

In a method of producing a metal component interacting by way of a sliding surface with a friction partner, for a drive assembly, particularly an internal-combustion engine, the component is formed of an at least eutectic aluminum silicon alloy for achieving a wear-resistant sliding surface.

For obtaining a component of sufficient stability and high resistance to wear with a reasonably priced Al-Si alloy, an aluminum-silicon-copper-magnesium alloy is used having a weight-related alloy fraction for silicon of 12–15%; for copper of 2.5% to 3.5%; and of magnesium of 0.4% –0.8%. The particle size for the silicon is between 4 μm and 30 μm. The sliding surface of the component in the firm condition is compressed by calibrating.

An AlSiCuMg alloy with Si=14%; Cu=3%; and Mg=0.6% was found to be particularly advantageous, particularly as a sintering material for constructing the component. The particle size of silicon in the sliding surface amounts to approximately 8–20 μm.

Furthermore, the component can also be produced by cutting from the AlSiCuMg alloy according to the present invention.

The alloy according to the present invention is preferably used for the construction of a sprocket or a gear wheel and particularly for a valve timing gear of an internal-combustion engine for advantageously reducing weight.

In addition, the alloy according to the present invention is preferred as a result of an at least partial use for a valve timing gear shaft adjusting device, particularly in the further development of a vane cell unit.

A preferred combination of both above-mentioned applications is achieved in that a housing of a valve timing gear shaft adjusting device has an integral construction with a sprocket by sintering.

Furthermore, the alloy according to the present invention can be used for a component which is designed as a guide bush for a charge cycle valve of an internal-combustion engine. When such guide bushes are used in a cylinder head constructed of an aluminum alloy, it is advantageous that both components have essentially the same coefficient of thermal expansion and increased deformations are therefore avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of producing a metal component that interacts with a friction partner via a sliding surface for a drive assembly, said method comprising:

forming a component having a wear-resistant sliding surface from an aluminum-silicon-copper-magnesium alloy comprising 12–15 wt. % silicon, 2.5–3.5 wt. % copper, and 0.4–0.8 wt. % magnesium, wherein a silicon particle size is between 4 μm and 30 μm; and compressing the sliding surface in a firm condition by calibrating, thereby embedding silicon particles.

2. A method according to claim 1, wherein the drive assembly is an internal-combustion engine.

3. A method according to claim 1, wherein the forming comprises sintering an aluminum-silicon-copper-magnesium alloy having 14 wt. % silicon, 3 wt. % copper, and 0.6 wt. % magnesium.

4. A method according to claim 3, wherein a particle size of silicon in the sliding surface is approximately 8 to 20 $\mu$m.

5. A method according to claim 1, the forming comprises cutting the aluminum-silicon-copper-magnesium alloy.

6. A component made according to the method of claim 3.

7. A sprocket or gear wheel comprising a component according to claim 6.

8. A valve timing gear of an internal-combustion engine comprising a component according to claim 6.

9. A valve timing gear device according to claim 8 having a housing that is integrally constructed with a sprocket by sintering.

10. A valve timing gear shaft adjusting device comprising a component according to claim 6.

11. A vane cell unit comprising a component according to claim 6.

12. A charge cycle valve of an internal-combustion engine having a guide bush comprising a component according to claim 6.

* * * * *